United States Patent
Ding et al.

(10) Patent No.: US 11,488,410 B2
(45) Date of Patent: Nov. 1, 2022

(54) PEDESTRIAN ARTICLE DETECTION APPARATUS AND METHOD AND ELECTRONIC DEVICE

(71) Applicant: FUJITSU LIMITED, Kawasaki (JP)

(72) Inventors: Lan Ding, Beijing (CN); Zhiming Tan, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/750,425

(22) Filed: Jan. 23, 2020

(65) Prior Publication Data
US 2020/0327314 A1     Oct. 15, 2020

(30) Foreign Application Priority Data

Apr. 11, 2019 (CN) .......................... 201910287813.6

(51) Int. Cl.
*G06V 40/10* (2022.01)
*G06K 9/62* (2022.01)
*G06T 7/70* (2017.01)

(52) U.S. Cl.
CPC .......... *G06V 40/103* (2022.01); *G06K 9/628* (2013.01); *G06K 9/6261* (2013.01); *G06T 7/70* (2017.01); *G06T 2207/20081* (2013.01); *G06T 2207/20084* (2013.01); *G06T 2207/30196* (2013.01); *G06T 2207/30232* (2013.01)

(58) Field of Classification Search
CPC .. G06K 9/00369; G06K 9/628; G06K 9/6261; G06K 2209/21; G06T 7/70; G06T 2207/20084; G06T 2207/20081; G06T 2207/30232; G06T 2207/30196
See application file for complete search history.

(56) References Cited

U.S. PATENT DOCUMENTS

| | | | |
|---|---|---|---|
| 9,704,047 B2* | 7/2017 | Shima | G06T 7/254 |
| 10,108,867 B1* | 10/2018 | Vallespi-Gonzalez | G01S 17/66 |
| 2007/0098253 A1* | 5/2007 | Crespi | G06V 20/53 382/103 |
| 2015/0161447 A1 | 6/2015 | Fu et al. | |
| 2016/0295171 A1* | 10/2016 | Van Den Brink | G06T 7/70 |
| 2020/0074165 A1* | 3/2020 | Ghafoor | G06V 10/20 |
| 2020/0097724 A1* | 3/2020 | Chakravarty | G06T 7/20 |
| 2020/0151489 A1* | 5/2020 | Sriram | G06K 9/00369 |
| 2020/0334448 A1* | 10/2020 | Ghazaryan | G06K 9/00771 |

(Continued)

FOREIGN PATENT DOCUMENTS

| | | |
|---|---|---|
| CN | 106250874 A | 12/2016 |
| CN | 107909580 A | 4/2018 |
| CN | 107944403 A | 4/2018 |

OTHER PUBLICATIONS

Joseph Redmon and Ali Farhad "YOLOv3: An Incremental Improvement" Apr. 8, 2018, Cornell University Computer Vision and Pattern Recognition (Year: 2018).*

(Continued)

*Primary Examiner* — Wesley J Tucker
(74) *Attorney, Agent, or Firm* — Staas & Halsey LLP

(57) ABSTRACT

Embodiments of this disclosure provide an apparatus and method. As target detection is performed in the detected pedestrian area by directly using the deep learning model, various article belonging to a pedestrian can be accurately detected in an input image.

9 Claims, 4 Drawing Sheets

(56) References Cited

U.S. PATENT DOCUMENTS

2021/0073564 A1* 3/2021 Piao ................. G06V 40/10

OTHER PUBLICATIONS

Georgia Gkioxari et al: "Detecting and Recognizing Human-Object Interactions", arxiv.org, Cornell University Library, 201 Olin Library Cornell University Ithaca, NY 14853, Apr. 24, 2017 (Apr. 24, 2017), XP081308809, figures 1-4 section 3 (Year: 2017).*

Li, Youjiao et al.; "A Survey of Person Re-identification"; Acta Automatica Sinica, vol. 44, No. 9, Sep. 2018; DOI 10.16383/j.aas.2018.c170505; Chinese Academic Journal Electronic Publishing House (15 pages).

* cited by examiner

PEDESTRIAN ARTICLE DETECTION APPARATUS AND METHOD AND ELECTRONIC DEVICE

CROSS-REFERENCE TO RELATED APPLICATIONS

This application is based on and hereby claims priority under 35 USC 119 to Chinese Patent Application No. 201910287813.6, filed Apr. 11, 2019, in the China National Intellectual Property Administration, the entire contents of which are incorporated herein by reference.

TECHNICAL FIELD

This disclosure relates to the field of information technologies, and in particular to a pedestrian article detection apparatus and method and an electronic device.

BACKGROUND

As the continuous development of information technologies, an intelligent surveillance system is not only used in social security but also has a huge potential in commercial applications. Benefitted from a deep learning model, pedestrian detection has achieved performance of an application level. How to describe a detected pedestrian is considered as being works of a next step.

Face is usually considered as a crucial feature to identify or describe a human. However, in a surveillance environment, face often cannot be used because of small volume, shielding or a back pose. Recently, methods have appeared in which the detected pedestrian is described by detecting articles belonging to the pedestrian, such as clothes, carried articles, and decorations.

In existing methods, an area where a pedestrian is located may be divided by previous knowledge of human proportions. For example, an upper clothes area and a lower clothes area are determined in the area where the pedestrian is located, and a classification model is used in a determined upper clothes area and lower clothes area to identify upper clothes and lower clothes. Furthermore, area segmentation may be performed according to a contour of a human body, and a classification model may be used for detection in segmented areas.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

It was found by the inventors that a monitored environment is relatively complicated, a case may occur where a pedestrian may not be fully detected, for example, the pedestrian is partially covered in which case it is impossible to accurately divide the upper clothes area and lower clothes area according to the knowledge of human proportions, resulting in inability to accurately detect the clothes. Furthermore, the method cannot detect other items than the clothes. Moreover, in segmenting various regions of the human body based on the contour of the human body, the process is relatively complicated and prone to being affected by noises, which may result in an inaccurate a detection result.

Embodiments of this disclosure provide a pedestrian article detection apparatus and method and an electronic device, in which target detection is performed in a detected pedestrian area by directly using a deep learning model, and detection blocks of articles belonging to the pedestrian in the pedestrian area and categories of the articles are directly outputted, hence, various articles belonging to the pedestrian can be accurately detected, and the detection is robust.

According to a first aspect of the embodiments of this disclosure, there is provided a pedestrian article detection apparatus, including: a first detecting unit configured to detect a pedestrian area in which a pedestrian is located in an input image; and a second detecting unit configured to perform object detection in a detected pedestrian area by directly using a deep learning model, and output detection blocks of articles belonging to the pedestrian in the pedestrian area and categories of the articles.

According to a second aspect of the embodiments of this disclosure, there is provided an electronic device, including the apparatus as described in the first aspect.

According to a third aspect of the embodiments of this disclosure, there is provided a pedestrian article detection method, including: detecting a pedestrian area in which a pedestrian is located in an input image; and performing object detection in a detected pedestrian area by directly using a deep learning model, and outputting detection blocks of articles belonging to the pedestrian in the pedestrian area and categories of the articles.

An advantage of the embodiments of this disclosure exists in that as target detection is performed in the detected pedestrian area by directly using the deep learning model, various article belonging to the pedestrian can be accurately detected. And as determination of a clothing area is not needed, the detection is robust. Furthermore, as segmentation of areas of the pedestrian according to a contour of the pedestrian is not needed, the detection speed is relatively fast and it is not prone to being affected by noises, thereby ensuring accuracy of the detection result.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

Embodiment 1

Figure 1:
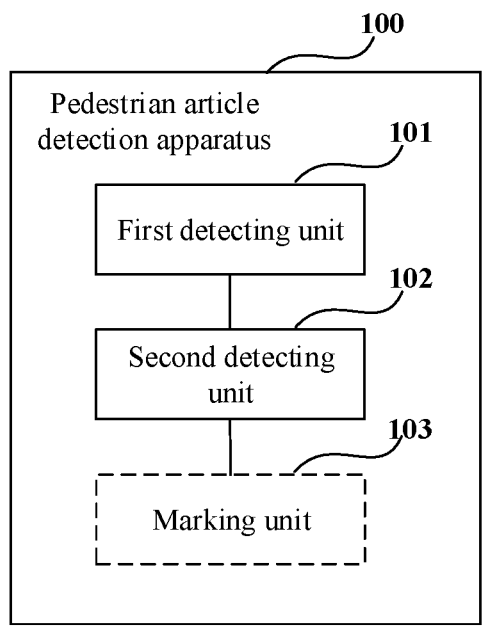
FIG. 1 is a schematic diagram of the pedestrian article detection apparatus of Embodiment 1 of this disclosure.

The embodiment of this disclosure provides a pedestrian article detection apparatus. FIG. 1 is a schematic diagram of the pedestrian article detection apparatus of Embodiment 1 of this disclosure. As shown in FIG. 1, a pedestrian article detection apparatus 100 includes: a first detecting unit 101 configured to detect a pedestrian area in which a pedestrian is located in an input image; and a second detecting unit 102 configured to perform object detection in a detected pedestrian area by directly using a deep learning model, and output detection blocks of articles belonging to the pedestrian in the pedestrian area and categories of the articles.

It can be seen from the above embodiment that as target detection is performed in the detected pedestrian area by directly using the deep learning model, various article belonging to the pedestrian can be accurately detected. And as determination of a clothing area is not needed the detection is robust. Furthermore, as segmentation of areas of the pedestrian according to a contour of the pedestrian is not needed, the detection speed is relatively fast and it is not prone to being affected by noises, thereby ensuring accuracy of the detection result.

In this embodiment, the input image may be various images containing pedestrians, such as images in a surveillance video.

In this embodiment, the first detecting unit 101 may detect the pedestrian area in which a pedestrian is located in the input image by using a related method, for example, the detection is performed by using feature pyramid networks (FPN), so as to obtain areas where all pedestrians are located in the input image, i.e. areas indicated by detection blocks of the pedestrians.

After the first detecting unit 101 detects the pedestrian areas where all pedestrians are located in the input image, when there are a plurality of detected pedestrian areas, the second detecting unit 102 performs object detection on the pedestrian areas by using a deep learning model, respectively, and respectively outputs detection blocks of the articles belonging to the pedestrians in the pedestrian areas and categories of the articles.

In this embodiment, the deep learning model may be various types of deep learning models. For example, the deep learning model is a deep convolutional neural network of type YoloV3. The YoloV3 deep convolutional neural network may detect all targets by reading the full image once, and has a good object detection performance while maintaining a relatively high processing speed, hence, it may further improve detection speed and accuracy.

In this embodiment, description shall be given by taking a YoloV3 deep convolutional neural network as an example.

In this embodiment, the articles may include various types of clothing, carries articles, and decorations.

In training the YoloV3 deep convolutional neural network, a dataset containing training images of various categories may be created in advance for training.

In this embodiment, a related method may be used as a particular method for training the YoloV3 deep convolutional neural network, which shall not be described herein any further.

Figure 2:
FIG. 2 is a schematic diagram of a pedestrian area of Embodiment 1 of this disclosure.
Figure 3:
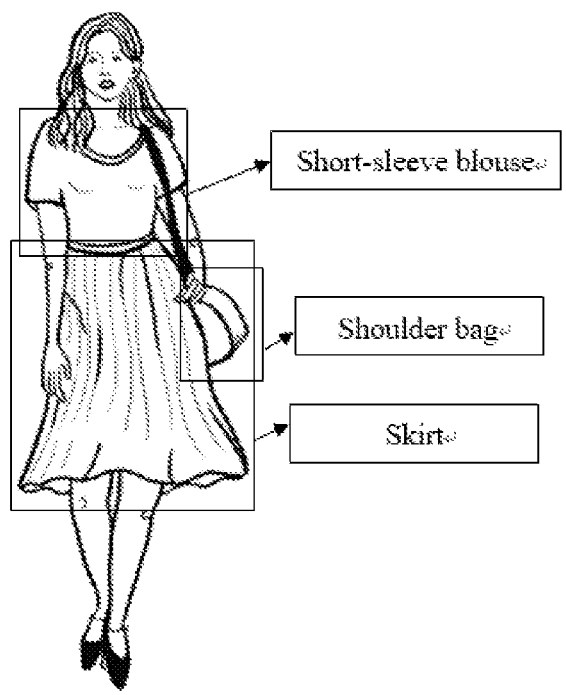
FIG. 3 is a schematic diagram of a detection result outputted by a second detecting unit of Embodiment 1 of this disclosure.

FIG. 2 is a schematic diagram of a pedestrian area of Embodiment 1 of this disclosure, and FIG. 3 is a schematic diagram of a detection result outputted by the second detecting unit of Embodiment 1 of this disclosure.

As shown in FIG. 2 and FIG. 3, for the pedestrian shown in the figures, the detection result output by the second detecting unit 102 includes the detection blocks of the articles belonging to the pedestrian and the categories of the articles, which are respectively "short-sleeve blouse", "shoulder bag" and "skirt", respectively.

Furthermore, the detection result outputted by the second detecting unit 102 may further include confidences of the categories of the articles, such as "short-sleeve blouse: 0.96", "shoulder bag: 0.88", and "skirt: 0.90".

Moreover, the detection result outputted by the second detecting unit 102 may further include positions of the articles, such as coordinates of center points of the detection blocks of the articles, and the widths and heights of the detection blocks.

Hereinafter, a structure and detection method of the second detecting unit 102 shall be illustrated.

Figure 4:
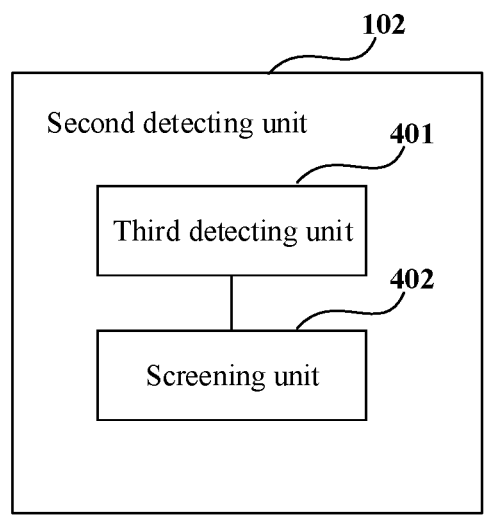
FIG. 4 is a schematic diagram of the second detecting unit of Embodiment 1 of this disclosure.

FIG. 4 is a schematic diagram of the second detecting unit 102 of Embodiment 1 of this disclosure. As shown in FIG. 4, the second detecting unit 102 includes: a third detecting unit 401 configured to detect detection blocks of all candidate articles within the detected pedestrian area and categories and confidences of the candidate articles by directly using the deep learning model; and a screening unit 402 configured to screen all the candidate articles in the pedestrian area, and output screened candidate articles as the articles belonging to the pedestrian.

For example, the third detecting unit 401 detects the detection blocks of all the articles as candidate articles by using the YoloV3 deep convolutional neural network in the pedestrian area, and outputs the categories of the articles and the confidences of the categories.

In this embodiment, the screening unit 402 screens all the candidate articles in the pedestrian area. For example, the screening unit 402 may screen the candidate articles according to at least one of: categories of the candidate articles; confidences of the categories of the candidate articles; an overlap ratio of detection blocks of at least two candidate articles; and a ratio of an area of a detection block of a candidate article to an area of the pedestrian area in which the candidate article is located.

For example, the screening unit 402 performs screening according to the categories of the candidate articles and the ratio of an area of a detection block of a candidate article to an area of the pedestrian area in which the candidate article is located. For example, for a candidate article, it has a reasonable size range, hence, a ratio of an area of its detection block to an area of the pedestrian area should also be within a preset range. And when the area ratio is not within the preset range, the candidate article is removed.

For example, the screening unit 402 performs screening according to an overlap ratio of detection blocks and confidences of at least two candidate articles. For example, only a candidate article with a highest confidence is reserved when the overlap ratio of the detection blocks of the at least two candidate articles satisfies a predetermined condition and categories of the at least two candidate articles are identical or similar. For example, when an overlap ratio of detection blocks of at least two candidate articles of categories being both "backpack" satisfies a predetermined condition and confidences of the two candidate articles are 0.95 and 0.80, respectively, the backpack of the confidence of 0.95 is reserved.

For example, the screening unit 402 performs screening according to the categories and confidences of the candidate articles. For example, only a candidate article with a highest confidence is reserved when at least two articles of mutually exclusive categories exist in the pedestrian area.

In this embodiment, the mutually exclusive categories refer to at least two categories of articles that should not occur at the same time in a normal situation, such as trousers and shorts, dresses and skirts, long-sleeve blouse and short-sleeve blouse, and the like.

In this embodiment, the apparatus 100 may further include: a marking unit 103 configured to mark an attribute of the pedestrian according to detected categories of the articles.

For example, when it is detected that the articles in the pedestrian area include "skirt" or "dress", an attribute of the pedestrian may be marked as "female", and when it is detected that the articles in the pedestrian area include "tie", an attribute of the pedestrian may be marked as "male." In this way, pedestrians may be accurately described based on the detected articles.

In this embodiment, the marking unit 103 is optional, and is shown by a dotted line frame in FIG. 1.

It can be seen from the above embodiment that as target detection is performed in the detected pedestrian area by directly using the deep learning model, various article belonging to the pedestrian can be accurately detected. And as determination of a clothing area is not needed, the detection is robust. Furthermore, as segmentation of areas of the pedestrian according to a contour of the pedestrian is not needed, the detection speed is relatively fast and it is not prone to be affected by noises, thereby ensuring accuracy of the detection result.

Embodiment 2

Figure 5:
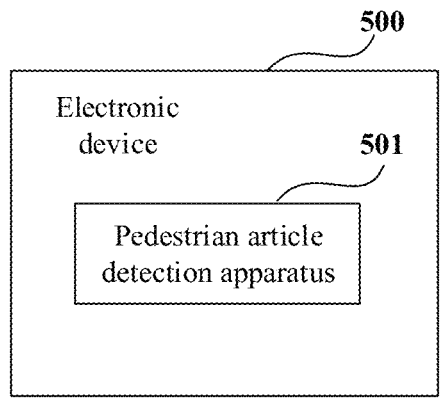
FIG. 5 is a schematic diagram of the electronic device of Embodiment 2 of this disclosure.

The embodiment of this disclosure further provides an electronic device. FIG. 5 is a schematic diagram of the electronic device of Embodiment 2 of this disclosure. As shown in FIG. 5, an electronic device 500 includes a pedestrian article detection apparatus 501, a structure and functions of which being identical to those described in Embodiment 1, which shall not be described herein any further.

Figure 6:
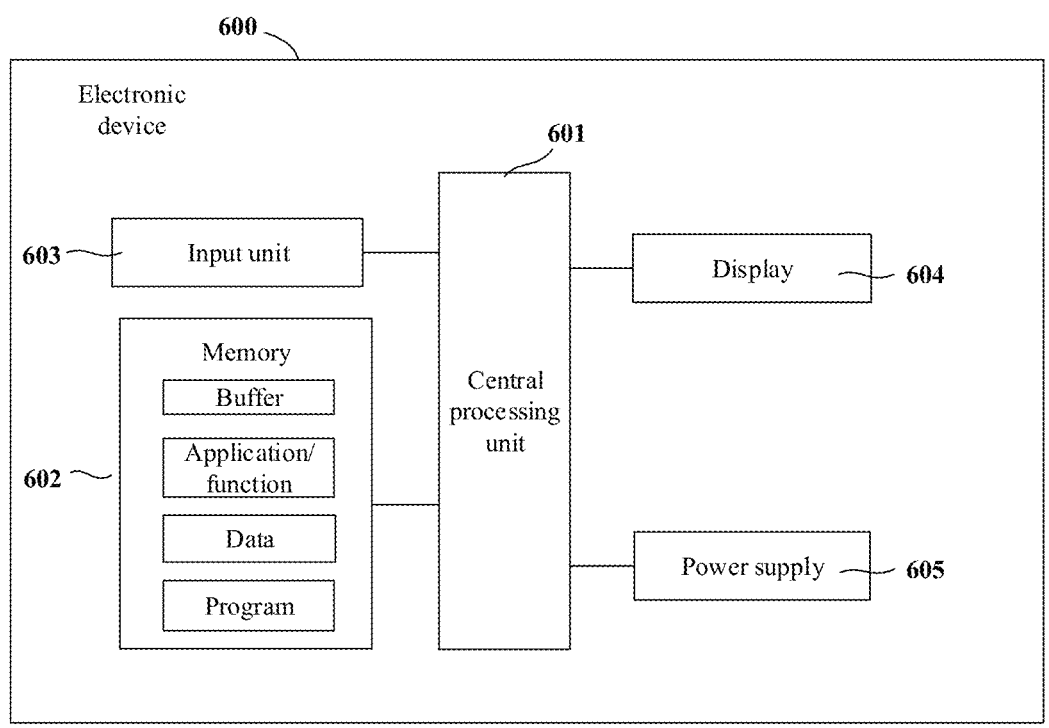
FIG. 6 is a block diagram of a systematic structure of the electronic device of Embodiment 2 of this disclosure.

FIG. 6 is a block diagram of a systematic structure of the electronic device of Embodiment 2 of this disclosure. As shown in FIG. 6, an electronic device 600 may include a central processing unit 601 and a memory 602, the memory 602 being coupled to the central processing unit 601. This figure is illustrative only, and other types of structures may also be used, so as to supplement or replace this structure and achieve a telecommunications function or other functions.

As shown in FIG. 6, the electronic device 600 may further include an input unit 603, a display 604, and a power supply 605.

In one implementation, the functions of the pedestrian article detection apparatus described in Embodiment 1 may be integrated into the central processing unit 601. The central processing unit 601 may be configured to: detect a pedestrian area in which a pedestrian is located in an input image; and perform object detection in a detected pedestrian area by directly using a deep learning model, and output detection blocks of articles belonging to the pedestrian in the pedestrian area and categories of the articles.

For example, the performing object detection in a detected pedestrian area by directly using a deep learning model includes: detecting detection blocks of all candidate articles within the detected pedestrian area and categories and confidences of the candidate articles by directly using the deep learning model; and screening all the candidate articles in the pedestrian area, and outputting screened candidate articles as the articles belonging to the pedestrian.

For example, the screening all the candidate articles in the pedestrian area includes: screening the candidate articles according to at least one of: categories of the candidate articles; confidences of the categories of the candidate articles; an overlap ratio of detection blocks of at least two candidate articles; and a ratio of an area of a detection block of a candidate article to an area of the pedestrian area in which the candidate article is located.

For example, only a candidate article with a highest confidence is reserved when the overlap ratio of the detection blocks of the at least two candidate articles satisfies a predetermined condition and categories of the at least two candidate articles are identical or similar, and/or, only a candidate article with a highest confidence is reserved when at least two articles of mutually exclusive categories exist in the pedestrian area.

For example, the articles include various types of clothing, carried articles and decorations.

For example, when the object detection is performed in the detected pedestrian area by directly using a deep learning model, positions of the articles belonging to the pedestrian in the pedestrian area are outputted further.

For example, the central processing unit 601 may further be configured to: mark an attribute of the pedestrian according to detected categories of the articles.

In another implementation, the pedestrian article detection apparatus described in Embodiment 1 and the central processing unit 601 may be configured separately. For example, the pedestrian article detection apparatus may be configured as a chip connected to the central processing unit 601, with the functions of the pedestrian article detection apparatus being carried out under control of the central processing unit 601.

In this embodiment, the electronic device 600 does not necessarily include all the components shown in FIG. 6.

As shown in FIG. 6, the central processing unit 601 is sometimes referred to as a controller or a control, which may include a microprocessor or other processor devices and/or logic devices, and the central processing unit 601 receives input and controls operations of every component of the electronic device 600.

The memory 602 may be, for example, one or more of a buffer memory, a flash memory, a hard drive, a mobile medium, a volatile memory, a nonvolatile memory, or other suitable devices, which may store the information on configuration, etc., and furthermore, store programs executing related information. And the central processing unit 601 may execute programs stored in the memory 602, so as to realize information storage or processing, etc. Functions of other parts are similar to those of the related art, which shall not be described herein any further. The parts of the electronic device 600 may be realized by specific hardware, firmware, software, or any combination thereof, without departing from the scope of this disclosure.

It can be seen from the above embodiment that as target detection is performed in the detected pedestrian area by directly using the deep learning model, various article belonging to the pedestrian can be accurately detected. And as determination of a clothing area is not needed, the detection is robust. Furthermore, as segmentation of areas of the pedestrian according to a contour of the pedestrian is not needed, the detection speed is relatively fast and it is not prone to be affected by noises, thereby ensuring accuracy of the detection result.

Embodiment 3

Figure 7:
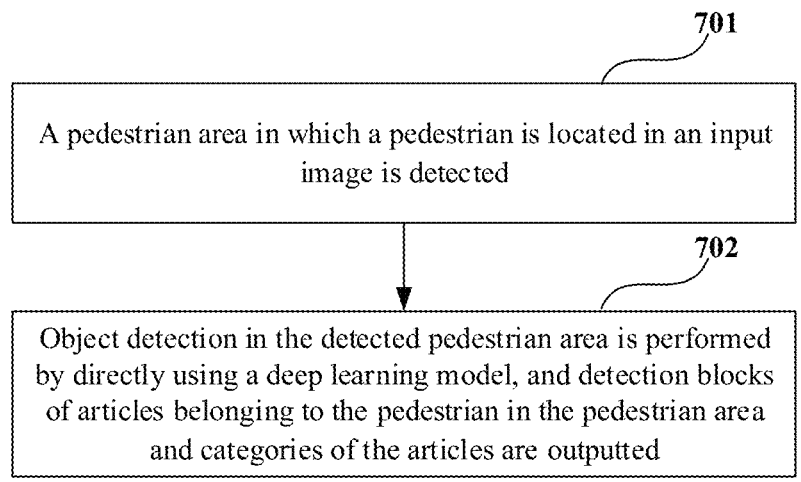
FIG. 7 is a flowchart of the pedestrian article detection method of Embodiment 3 of this disclosure.

The embodiment of this disclosure further provides a pedestrian article detection method, corresponding to the pedestrian article detection apparatus in Embodiment 1. FIG. 7 is a flowchart of the pedestrian article detection method of Embodiment 3 of this disclosure. As shown in FIG. 7, the method includes: Step 701: a pedestrian area in which a pedestrian is located in an input image is detected; and Step 702: object detection in the detected pedestrian area is performed by directly using a deep learning model, and detection blocks of articles belonging to the pedestrian in the pedestrian area and categories of the articles are outputted.

In this embodiment, reference may be made to what is described in Embodiment 1, which shall not be described herein any further.

It can be seen from the above embodiment that as target detection is performed in the detected pedestrian area by directly using the deep learning model, various article belonging to the pedestrian can be accurately detected. And as determination of a clothing area is not needed, the detection is robust. Furthermore, as segmentation of areas of the pedestrian according to a contour of the pedestrian is not needed the detection speed is relatively fast and it is not prone to being affected by noises, thereby ensuring accuracy of the detection result.

An embodiment of the present disclosure provides a computer readable program, which, when executed in a pedestrian article detection apparatus or an electronic device, will cause a computer to carry out the pedestrian article detection method as described in Embodiment 3 in the pedestrian article detection apparatus or the electronic device.

An embodiment of the present disclosure provides a computer storage medium, including a computer readable program, which will cause a computer to carry out the pedestrian article detection method as described in Embodiment 3 in a pedestrian article detection apparatus or an electronic device.

The pedestrian article detection method carried out in the pedestrian article detection apparatus or the electronic device described with reference to the embodiments of this disclosure may be directly embodied as hardware, software modules executed by a processor, or a combination thereof. For example, one or more functional block diagrams and/or one or more combinations of the functional block diagrams shown in FIG. 1 may either correspond to software modules of procedures of a computer program, or correspond to hardware modules. Such software modules may respectively correspond to the steps shown in FIG. 7. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in FIG. 1 may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in FIG. 1 may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

As to implementations containing the above embodiments, following supplements are further provided in this disclosure.

According to an aspect of an embodiment, a pedestrian article detection method, includes detecting a pedestrian area in which a pedestrian is located in an input image; and performing object detection in a detected pedestrian area by directly using a deep learning model, and outputting detection blocks of articles belonging to the pedestrian in the pedestrian area and categories of the articles.

The performing object detection in a detected pedestrian area by directly using a deep learning model includes detecting detection blocks of all candidate articles within the detected pedestrian area and categories and confidences of the candidate articles by directly using the deep learning model; and screening all the candidate articles in the pedestrian area, and outputting screened candidate articles as the articles belonging to the pedestrian.

The screening all the candidate articles in the pedestrian area includes screening the candidate articles according to at least one of categories of the candidate articles; confidences of the categories of the candidate articles; an overlap ratio of detection blocks of at least two candidate articles; and a ratio of an area of a detection block of a candidate article to an area of the pedestrian area in which the candidate article is located.

According to an aspect of an embodiment, only a candidate article with a highest confidence is reserved when the overlap ratio of the detection blocks of the at least two candidate articles satisfies a predetermined condition and categories of the at least two candidate articles are identical or similar, and/or, only a candidate article with a highest confidence is reserved when at least two articles of mutually exclusive categories exist in the pedestrian area.

According to an aspect of an embodiment, the articles include various types of clothing, carried articles and decorations.

According to an aspect of an embodiment, when the object detection is performed in the detected pedestrian area by directly using a deep learning model, positions of the articles belonging to the pedestrian in the pedestrian area are outputted further.

The method further includes marking an attribute of the pedestrian according to detected categories of the articles.

The deep learning model is a YoloV3 deep convolutional neural network.

The invention claimed is:

1. An apparatus, comprising:
a processor that couples to a memory to,
   detect a pedestrian area in which a pedestrian is located in an input image;
   perform object detection in a detected pedestrian area by directly using a deep learning model, and not a segment clothing sub-areas and sub-areas of a human body as the pedestrian in the pedestrian area; and
   output detection blocks of detected articles belonging to the pedestrian in the pedestrian area and categories of the detected articles,
wherein to output the detection blocks and the categories, the processor is to,
   detect detection blocks of candidate articles within the detected pedestrian area including categories and confidences of the candidate articles by directly using the deep learning model;
   screen the candidate articles in the pedestrian area; and
   output the screened candidate articles as the detected articles belonging to the pedestrian.

2. The apparatus according to claim 1, wherein,
the processor screens the candidate articles according to any one or combination of screenings including:
categories of the candidate articles;
confidences of the categories of the candidate articles;
an overlap ratio of detection blocks of at least two candidate articles among the detection blocks; and
a ratio of an area of a detection block of a candidate article among the detection blocks to an area of the pedestrian area in which the candidate article is located.

3. The apparatus according to claim 2, wherein,
the processor is to,
   reserve only a candidate article with a highest confidence when the overlap ratio of the detection blocks of the at least two candidate articles satisfies a determined condition and categories of the at least two candidate articles are identical or similar, and/or
   reserve only a candidate article with a highest confidence when at least two articles of mutually exclusive categories exist in the pedestrian area.

4. The apparatus according to claim 1, wherein,
the detected articles comprise various types of clothing, carried articles and decorations.

5. The apparatus according to claim 1, wherein,
the processor is to output positions of the detected articles belonging to the pedestrian in the pedestrian area.

6. The apparatus according to claim 1, wherein the processor is to mark an attribute of the pedestrian according to detected categories of the detected articles.

7. The apparatus according to claim 1, wherein,
the deep learning model is a YoloV3 deep convolutional neural network.

8. An electronic device, comprising the apparatus as claimed in claim 1.

9. A method by an electronic device to detect a pedestrian article, the method comprising:
detecting a pedestrian area in which a pedestrian is located in an input image;
performing object detection in the detected pedestrian area by directly using a deep learning model, and not segmenting clothing sub-areas and sub-areas of a human body as the pedestrian in the pedestrian area; and
outputting detection blocks of detected articles belonging to the pedestrian in the pedestrian area and categories of the detected articles,
wherein the performing object detection in the detected pedestrian area by directly using a deep learning model and the outputting detection blocks of detected articles belonging to the pedestrian in the pedestrian area and categories of the detected articles includes,
detecting detection blocks of candidate articles within the detected pedestrian area including categories and confidences of the candidate articles by directly using the deep learning model;
screening the candidate articles in the pedestrian area; and
outputting the screened candidate articles as the detected articles belonging to the pedestrian.

* * * * *